Feb. 8, 1955 B. E. DEL MAR 2,701,514
SAFETY DEVICE FOR PRESSURIZABLE AIRCRAFT CABINS
Original Filed May 13, 1946
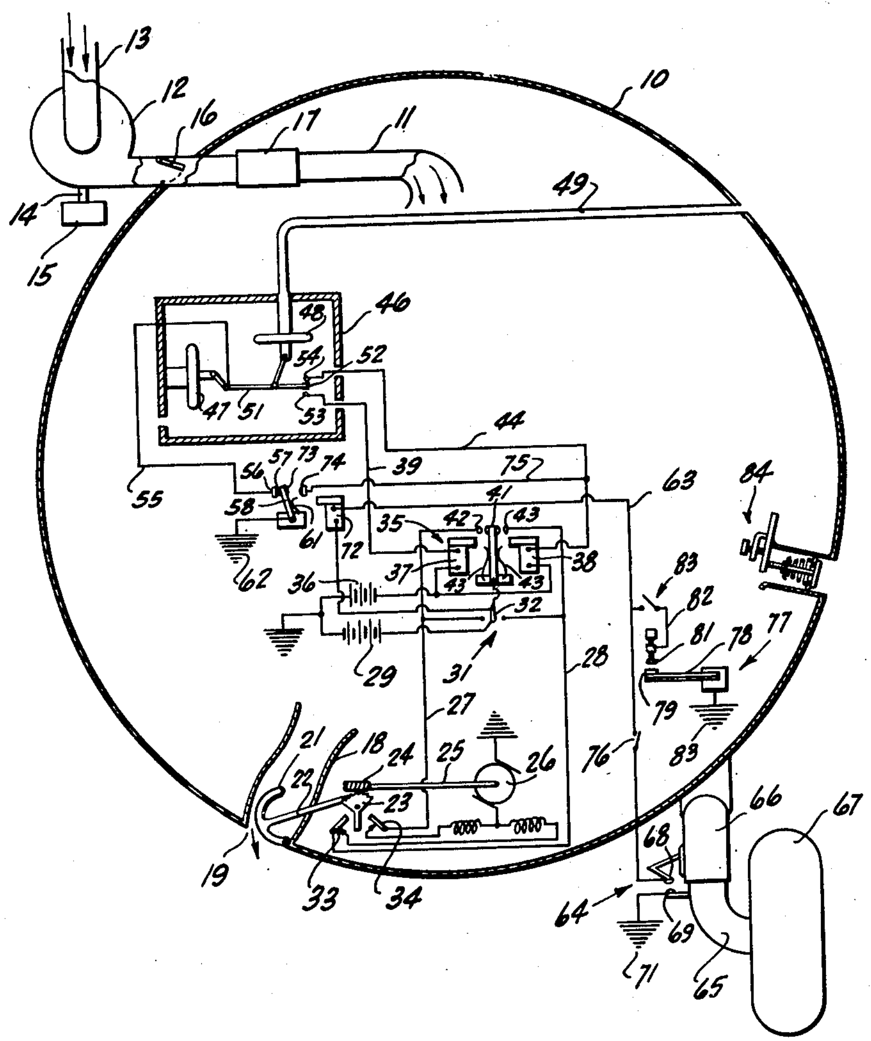
INVENTOR.
BRUCE E. DEL MAR
BY
J. Edwin Coates
· ATTORNEY ·

United States Patent Office 2,701,514

Patented Feb. 8, 1955

2,701,514

SAFETY DEVICE FOR PRESSURIZABLE AIRCRAFT CABINS

Bruce E. Del Mar, Los Angeles, Calif., assignor to Douglas Aircraft Company, Inc., Santa Monica, Calif.

Original application May 13, 1946, Serial No. 669,366. Divided and this application April 12, 1951, Serial No. 220,692

5 Claims. (Cl. 98—1.5)

This invention relates to safety means for regulating pressure in cabins such as those of aircraft and more particularly to a safety means for equalizing cabin pressure with atmospheric pressure under certain operating conditions of the aircraft.

This application is a division of my copending application, Serial No. 669,366, now Patent No. 2,549,673. In the pressure regulating system there shown, at least one manually operable instrument is provided for regulating cabin absolute pressure in accordance with some desired schedule. The instrument, once manually preset by the pilot or operator, will thereafter automatically control cabin absolute pressure as the aircraft is flown at varying altitudes. As the instrument is manually set, there is always the possibility that the instrument may be inadvertently set to produce within the cabin a pressure higher than ambient atmospheric pressure at the time the aircraft descends to a landing field. The existing cabin differential pressure may, as the cabin doors are opened, cause injury to the crew or passengers or at least subject them to an uncomfortably rapid change in pressure.

To obviate all danger of the aircraft landing pressurized, that is, landing with cabin absolute pressure higher than atmospheric pressure at the landing field, the present invention provides means for automatically venting the interior of the cabin to ambient air as soon as the landing gear of the aircraft supports the aircraft on the field. In the broadest aspects of the present invention, this means comprises normally inoperative means for opening a valve in the cabin wall and made operative by the landing gear of the aircraft contacting the surface of the airport as the aircraft lands thereon. This valve actuating means, in the now preferred embodiment of the present invention, comprises a pair of relatively movable elements which coact, when the weight of the aircraft is taken by the landing gear, to so operate the valve as to bring about opening movement of the same as the aircraft completes its landing run and taxis to the passenger unloading station.

In the illustrated embodiment of the present invention, the relatively movable elements form a switch means for controlling energization of a circuit which, when energized, brings about opening movement of the valve. The switch means thus formed is normally held in an open circuit position so long as the aircraft is air-borne, but is moved to a closed circuit position as the weight of the aircraft is taken by the landing gear.

A further feature of the present invention is the provision in this circuit of a temperature responsive switch also operative to bring about energization of the circuit whenever cabin temperature exceeds a preselected maximum temperature. This switch is under the control of a heat sensitive element disposed within the cabin and thus subject to the temperature of the air in the cabin.

Other features and advantages of the present invention will be apparent from the following description taken in connection with the accompanying drawing in which the figure is a diagrammatic view of the control means of the present invention as applied to a typical aircraft.

The control means of the present invention, referring now to the drawing, is one, operative at times, for controlling the pressure within a sealed aircraft cabin diagrammatically shown at 10. Air is directed into the cabin through an air duct 11 arranged to deliver a flow of ventilation air to the cabin from a super-charger or blower 12. The blower 12 is arranged to be supplied with air from a ram duct 13 and is driven through a shaft by a speed controlled prime mover 15 in such a manner that a substantially constant rate of ventilation air is supplied through the duct 11 to the cabin 10. Although one cabin supercharging blower is shown for simplifying the illustration of the now preferred embodiment of the present invention, it is obvious that a plurality of blowers operating in parallel could be used.

A check valve 16 is mounted within the duct 11 and is so formed that it will be opened by a flow of air through the duct, but will close and seal the duct 11 to maintain cabin pressure in the event of failure of air flow through the duct 11.

If desired, some conventional temperature regulating means may be mounted in the duct 11 to control the temperature of the incoming air to maintain the air supplied to the cabin at a preselected temperature. This air temperature conditioner, diagrammatically shown at 17, may also include its own automatic temperature control means operated in response to temperature sensitive elements or controls mounted within the cabin and subject to the temperature of the air therein.

A discharge duct 18 leading to an outlet 19 in the cabin wall is provided for the discharge of vitiated air from the cabin. The rate of air discharge is controlled by a movable valve 21 which is interposed in or forms a part of the duct 18. The valve 21, as it is moved, will vary the outlet area and thus vary the rate of air discharge from the cabin.

Since a substantially constant rate of air flow enters the cabin through the inlet duct 11, cabin absolute pressure will be increased when the discharge valve 21 is closed or moved toward the closed position to decrease the rate of air discharge relative to the rate of air delivery to the cabin. On the other hand, if the valve 21 is opened and the rate of air discharge is greater than the rate of air delivery, the pressure within the cabin will be decreased.

Although any means desired may be used to control movement of the valve 21, in the illustrated embodiment of the invention the control of this valve is effected through an operating linkage 22 carrying a sector gear 23 engaged by a worm gear 24 fixed to one end of a shaft 25. The shaft 25 is driven by a prime mover 26 which, in the embodiment illustrated, is shown as an electric motor of the reversible split field series type. Although, for the purpose of illustrating the invention, the prime mover 26 has been shown as an electric motor, obviously hydraulic or pneumatic power could be substituted without departing from the present invention.

The motor 26 may be energized either through a field coil circuit 27 or a field coil circuit 28 by power from some suitable source such as a battery, indicated at 29, to open or close the valve 21 depending upon the direction of rotation of the motor. In the embodiment of the invention illustrated energization of the motor field coil circuit 27 will bring about closing movement of the valve 21 while energization of the circuit 28 produces closing movement of the valve.

To provide manual control of the motor and consequently of the valve 21, a directional switch 31 is provided to selectively energize one or the other of the motor field coil circuits. In the embodiment of the invention illustrated, movement of the switch arm 32 into engagement with the left hand contact, as viewed in the figure, will obviously result in energization of the motor field coil circuit 27 while movement of the arm 32 into engagement with the right hand contact will energize motor field coil circuit 28. Some direct manual control of the valve 21, although not shown, may be added or substituted for the manual control switch 31, if so desired.

To prevent over travel of the valve 21, limit switches 33 and 34 are connected into the motor field coil circuits 28 and 27, respectively, the limit switch 33 will open to de-energize the field coil circuit 28 when the valve 21 reaches its fully opened position while the switch 34 will open the field coil circuit 27 when the valve 21 reaches its fully closed position.

In the normal operation of the control means of the present invention, the switch arm 32 is maintained in the position as shown in the figure. In this operation, control of the valve 21 is effected through a control relay 35 which, as shown for illustrative purposes, is essentially a power amplifier in which very small current from a battery 36 can be used to selectively energize coils 37 and 38 of the relay 35 to control a flow of relatively large current in the motor field coil circuits 27 and 28. Energization of a control circuit 39, in which the relay coil 37 is electrically connected, will cause the armature 41 of the relay 35 to move to the left, as viewed in the figure, and into engagement with a contact 42, against the action of one of a pair of centering springs 43, to complete a circuit from the battery 29 through the motor field coil circuit 27. It will be remembered that energization of this field coil circuit produces such rotation of the motor 26 as to drive the valve 21 toward closed position and thus decrease the rate of air discharge from the cabin.

Energization of a control circuit 44, in which the relay coil 38 is electrically connected, will cause the armature 41 of the relay to move to the right, as viewed in the figure, to engage with contact 45 against the action of the other of the pair of centering springs 43 to complete a circuit from the battery 29 through the motor field coil circuit 28. The completion of this circuit energizes the motor 26 to produce such rotational movement thereof as to drive the valve 21 toward the open position to increase the rate of air discharge from the cabin.

Control circuits 39 and 44 are separately energized through the control action of an instrument indicated at 46. This instrument may be the ratio to flight cabin pressure regulator of my copending application, which comprises an aneroid 47 subject to cabin absolute pressure and a pressure sensitive capsule 48, the interior of which is subject to flight absolute pressure by way of a conduit 49 connecting the interior of the capsule to flight absolute pressure. The exterior of the capsule 48 is subject to cabin absolute pressure so that this capsule responds to changes in cabin differential pressure. The aneroid 47 and the cabin differential pressure capsule 48 coact together through a linkage system to control the position of a pivotally mounted control arm 51.

The control arm 51 carries a contact 52, which is movable between and into engagement with one or the other of contacts 53 and 54, connected respectively into control circuits 39 and 44. The control arm 51 is electrically connected to a lead 55 which includes a contact 56 normally engaged by contact 57 carried by an armature 58 forming a part of a relay 59. A spring 61 normally urges the armature 58 to the left, as viewed in the figure, to thus normally hold contact 57 in engagement with the contact 56. The armature is grounded, as indicated at 62, so that the control arm 51 will be grounded so long as the armature 58 is maintained by the spring 61 in its normal position, as shown in the drawing.

It should now be seen that the control instrument 46 will control energization of control circuits 39 and 44 and consequently cabin absolute pressure so long as contact 57 of the armature 58 is maintained in engagement with contact 56. This is so, for as the arm 51 is moved under the urging of the aneroid 47 and capsule 48 to move contact 52 into engagement with either contact 53 or 54, either one or the other of the control circuits will be energized to bring about movement of the valve 21.

The contacts 53 and 54 are relatively movable through manually operable presetting means, not shown, to vary the control action of the instrument 46, which is further variable through a control means, not shown, but which modifies the linkage mechanism interconnecting the aneroid 47 and pressure capsule 48 with the control arm 51. These control means have not been shown, but suffice it to say the controls are such that the instrument 46 is capable of varying cabin absolute pressure in response to changes in cabin absolute pressure or flight absolute pressure or both.

As the control means of the instrument 46 are manually preset by the pilot or operator, there exists the possibility that the instrument will be inadvertently preset to produce within the cabin an absolute pressure greater than the atmospheric pressure at a landing field on which the aircraft lands. If the aircraft should land pressurized, that is with the cabin at a pressure higher than atmospheric pressure, the existing cabin differential pressure, as the doors or other exits of the cabin are opened, may cause injury to the crew or passengers or damage the aircraft itself.

To prevent any pressure differential that may exist between the sealed cabin and the ambient atmosphere at the time of landing, means are provided for, first, rendering the instrument 46 inoperative to control energization of the control circuit 39 and 44 and, secondly, to energize motor field coil circuit 28, which, it will be remembered, produces opening movement of the valve 21. In the now preferred embodiment of the present invention, this safety means comprises a circuit conductor 63 normally open, but energized through a switch 64 forming a part of the landing gear of the aircraft.

The landing gear, as shown in the drawing, is of the conventional retractable design in current use on practically all present day commercial aircraft. This gear includes a hydraulic shock strut 65 movable in a cylinder housing 66 in such a manner that the strut and a wheel 67 carried thereby move upwardly as the weight of the aircraft is taken by the landing gear. On the other hand, when the aircraft is air-borne and the weight of the aircraft is no longer being borne by the landing gear, the strut and the wheel move downwardly with respect to the aircraft.

In the embodiment of the present invention, the switch 64 comprises relatively movable contact elements 68 and 69 carried, respectively, by the cylinder housing 66 and the strut 65. These elements form a part of conductor 63 and element 69 is grounded, as indicated at 71. When the weight of the aircraft is taken by the landing gear and the strut 65 moves upwardly in the cylinder housing 66 sufficient to move element 69 into engagement with element 68, a circuit is completed from the battery 29 which includes switch arm 32, coil 72 of the relay 59, conductor 63, and thence to ground 71 by way of the now closed switch 64. Energization of the relay coil 72 moves the armature 58 to the right, as viewed in the figure, to move contact 73 carried by the armature into engagement with contact 74 connected to a lead 75 which electrically interconnects contact 73 and control circuit 44. It can be pointed out here that movement of the armature 58 to the right, as viewed in the figure, brings about separation of the contacts 56 and 57 to interrupt the grounding conductor 55 of the control arm 51. Thus, the instrument 46 is rendered inoperative to effect energization of the control circuits 39 and 44 as long as relay coil 72 remains energized.

As control circuit 44 is automatically energized by closing of the switch 64, coil 38 of the relay 35 will also be energized to produce energization of the motor field coil circuit 28, which, it will be remembered, results in opening movement of the valve 21. It will thus be seen that the valve 21 will commence to move toward open position as soon as the weight of the aircraft is taken by the landing gear to produce engagement of the switch components 68 and 69. As the aircraft taxis toward the passenger unloading zone, the valve 21 will be moved to its open position and thus will eliminate any pressure differential that may exist between the interior of the cabin and the ambient atmosphere at the time the aircraft lands at the airport. Any existing cabin differential pressure will thus be dissipated before the doors or other exits of the aircraft are opened at the passenger unloading zone.

As the control instrument 46 is rendered inoperative so long as the aircraft is supported by the landing gear, a switch 76 is provided in conductor 63 to permit this conductor to be disconnected from the battery 29 whenever it might be desired to test the cabin pressurization system while the aircraft is parked. It will be seen that so long as the switch 76 is in its open circuit position, the coil 72 of the relay 59 will remain de-energized and the armature 58 will be held by the spring 61 in a position in which contacts 56 and 57 are engaged.

A further feature of the present invention is the provision within the cabin of a temperature responsive switch 77 also adapted to control energization of the relay coil 72. This temperature responsive switch 77 will effectively prevent cabin air from exceeding some predetermined maximum. This switch 77 comprises a thermostat in the form of a bimetallic arm 78 carrying a contact 79 and movable by the bimetallic arm 78 at some predetermined temperature into engagement with a contact 81 forming a part of a conductor 82 leading to conductor 63. As the contact 79 is grounded, as indicated at 83, movement of the bimetallic arm 78, such as to move contact 79 into engagement with contact 81, will result in energization of the coil 72 of the relay 59. It will be remembered that energization of this coil, through movement of the armature 58, disconnects the control instrument 46 from the system while simultaneously energizing the motor 26 to produce such directional rotation to bring about opening movement of the valve 21.

A manually operable switch 83 forming a part of the conductor 82, when opened disconnects the switch 77 from the conductor 63 and thus renders this switch inoperative to control energization of the coil 72. By setting contact 81 to be engaged by contact 79 at some desired upper tolerance limit of cabin temperature and with switch 83 closed, cabin differential pressure may be limited to values which will prevent serious cabin temperature discomfort in favor of cabin pressure comfort even though unreasonable schedules of cabin pressure control are attempted during extremely warm weather. Reduction of cabin temperature is normally associated with a reduction of cabin pressure since incoming air is heated by the super-charger somewhat in proportion to the cabin differential pressure. For most high altitude operations in normal or cold weather, additional heat will be required to maintain the temperature of the cabin at a comfortable level even while flying with full cabin pressurization. This additional heat would be supplied by some form of heater, not shown, but associated with the air temperature conditioner 17.

Although the switch means 64 and 77 are shown as controlling operation of the discharge valve 21, it should be obvious that these control elements could also be used to regulate or control the position of some auxiliary valve which, when opened, would communicate the interior of the cabin with ambient atmosphere. By conventional actuating means the relief valve indicated at 84 could be used to communicate the interior of the cabin with ambient atmosphere under the control action of the switch means 64 and 77. This relief valve, as shown in the figure, is merely a spring loaded valve which will open whenever cabin differential pressure exceeds some predetermined limit, but yet obviously could be easily converted to serve the additional function of opening under the control of switch means 64 and 77.

It should now be seen that the control means of the present invention forms a safety device for reducing cabin differential pressure to zero, whenever the aircraft is supported on the ground, to obviate pressurization of the cabin due to such inadvertent setting of the control instrument as to cause pressurization prior to flight or as the aircraft lands after a flight during which the cabin has been pressurized. The reduction of cabin differential pressure to zero obviously prevents any damage to the aircraft or injury to the passengers, which might well occur if a door or other exit means from the cabin was opened while the cabin air was at a pressure greater than the ambient atmospheric pressure.

The provision of the temperature responsive switch also operative to control energization of the valve operating motor affords an additional safety factor in that the cabin temperature cannot become excessive because of the compression of the incoming air by the supercharging blowers. The inclusion of this switch in the circuit of the landing gear operated switch simplifies the construction and maintenance of the control elements and yet does not complicate the control action.

Although the embodiment of the present invention has been herein shown and described as one controlling an electrical system, it should be obvious that other types of motivating systems could be used, such as hydraulic or pneumatic, as the particular type of system is not important to the invention herein disclosed. Therefore, although the now preferred embodiment of the present invention has been illustrated and disclosed herein, it is to be understood that the invention is not to be limited thereto for the same is susceptible to changes in form and detail within the scope of the appended claims.

I claim:

1. A safety device for a pressure control system having manually presettable means for controllably maintaining the absolute pressure within a cabin of an aircraft having a landing gear, comprising: a valve in said cabin for communicating the interior of said cabin with ambient atmosphere; means for operating said valve; and means, including means carried by said landing gear, operatively interconnecting said landing gear and said valve operating means to actuate the same to open the valve when the load of the aircraft is supported by said landing gear to obviate pressurization of said cabin because of inadvertent setting of said manually presettable means resulting in an increase of cabin absolute pressure over ambient atmospheric pressure at the time the aircraft is landed on the ground.

2. A safety device for a control system regulating the absolute pressure in a pressurizable cabin of an aircraft having a landing gear, comprising: a valve movable for variably restricting an aperture in the wall of said cabin; means, including means carried by said landing gear for operating said valve to open said aperture so long as said landing gear is supporting said aircraft on the ground, thereby to communicate the interior of the cabin with ambient atmosphere to obviate pressurization of the cabin prior to flight and for equalizing cabin absolute pressure with ambient absolute pressure upon landing of the aircraft; and means for rendering said last named means inoperable whereby said valve may be closed while said aircraft is parked on the ground to permit trial pressurization without flight of the aircraft.

3. A safety device for a pressure control system having manually presettable means for controllably maintaining the absolute pressure within a cabin of an aircraft having a landing gear, comprising: a valve in said cabin for communicating the interior of said cabin with ambient atmosphere; means for actuating said valve; and means, including means carried by said landing gear and made operative by the subjection of the landing gear to the weight of the aircraft, for operating said valve actuating means to open the valve, thereby when the load of the aircraft is supported by said landing gear said valve is opened, thereby obviating pressurization of said cabin because of inadvertent setting of said manually presettable means producing cabin differential pressure at the time said aircraft is landed on the ground.

4. A safety device for a control system regulating absolute pressure in a pressurizable cabin of an aircraft having a relatively movable two-component landing gear, comprising: a valve to be mounted in said cabin for communicating the interior of said cabin with ambient atmosphere; means for operating said valve; means normally inoperative but rendered operative by the relative movement of said components as the landing gear engages the ground during landing of the aircraft for so actuating said valve operating means as to open said valve to communicate the interior of the cabin with the ambient atmosphere, thereby to equalize cabin absolute pressure with atmospheric pressure at the landing field; and manually operable means for rendering said last named means inoperative, whereby said valve may be closed to permit trial pressurization of said cabin prior to flight of the aircraft.

5. A safety means for a control system regulating the absolute pressure in the cabin of an aircraft having a landing gear including a ground engaging component movable relative to a fixed component carried by the aircraft, comprising: a valve to be movably mounted to said cabin for variably restricting an aperture formed in said cabin and communicating the interior thereof with ambient atmosphere; means for actuating said valve to open said aperture; normally inoperative means for operating said actuating means; and means, including means spacedly carried by each of said gear components and movable into operative engagement to render said normally inoperative means operative upon engagement of said ground engaging component with the ground and the consequent movement thereof relative to the other component as the aircraft is landed to actuate said valve to open said aperture, thereby to communicate the interior of the cabin with ambient atmosphere to obviate pressurization of the cabin prior to flight and for equalizing cabin absolute pressure with ambient absolute pressure upon landing of the aircraft.

References Cited in the file of this patent

UNITED STATES PATENTS

| | | |
|---|---|---|
| 2,208,554 | Price | July 16, 1940 |
| 2,321,582 | Crane et al. | June 15, 1943 |
| 2,515,639 | Draney | July 18, 1950 |
| 2,549,673 | Del Mar | Apr. 17, 1951 |
| 2,578,773 | Arthur | Dec. 18, 1951 |
| 2,585,295 | Baak | Feb. 12, 1952 |